2

3,057,819
MIXED SULFIDES AS FLEX-CRACKING
INHIBITORS
Richard W. Kibler, Cuyahoga Falls, Ohio, assignor to The
Firestone Tire & Rubber Company, Akron, Ohio, a corporation of Ohio
No Drawing. Filed Jan. 15, 1960, Ser. No. 2,594
6 Claims. (Cl. 260—45.9)

This invention relates to mixed sulfides, their use as flex-cracking inhibitors in rubber, and the inhibited rubber.

It is generally recognized that diphenyl-p-phenylenediamine and its methyl and ethyl derivatives inhibit flex cracking in rubber, but these materials have only limited solubility in rubber. On standing, they bloom to the surface, and this is objectionable.

The flex-cracking inhibitors of this invention are mixed sulfides of (1) N,N'-diphenyl-p-phenylenediamine and its ring-substituted methyl and ethyl derivatives and (2) a different N,N'-disubstituted-p-phenylenediamine or N,N'-disubstituted-p-tolylenediamine which is soluble in diene rubbers in concentrations at which said N,N'-diphenyl-p-phenylenediamine and its ring-substituted methyl and ethyl derivatives bloom from said rubber. These mixed sulfides are more soluble in such rubbers than N,N'-diphenyl-p-phenylenediamine and its ring-substituted methyl and ethyl derivatives.

Any one or more of the three nuclei of the less soluble phenylenediamine may be unsubstituted, or they may contain one or more methyl or ethyl groups in any desired position. The following list contains compounds typical of the less soluble phenylenediamines that can be used in making the mixed sulfides:

N,N'-diphenyl-p-phenylenediamine
N,N'-diphenyl-p-tolylenediamine
N,N'-diphenyl-o or m-ethyl-p-phenylenediamine
N,N'-diphenyl-2,5-dimethyl-p-phenylenediamine
N,N'-diphenyl-2,6-dimethyl-p-phenylenediamine
N-xylyl, N'-phenyl-p-phenylenediamine
N-tolyl, N'-phenyl-p-phenylenediamine
N,N'-dixylyl-p-tolylenediamine
N,N'-dixylyl-p-phenylenediamine
N,N'-diphenyl-2,5-diethyl-p-phenylenediamine
N,N'-diphenyl-2,6-diethyl-p-phenylenediamine
N,N'-di-o, p-, or m-tolyl-p-phenylenediamine
N,N'-di-o, p-, or m-tolyl-p-tolylenediamine
N,N'-di-o, p-, or m-ethylphenyl-p-tolylenediamine The tolyl and xylyl derivatives include all position isomers. Thus, the diphenyl-p-phenylenediamine may contain any desired number of methyl or ethyl substituents in any position in any one or more of the rings.

The more soluble p-phenylenediamine may contain up to four methyl or ethyl substituents in any positions in the phenylene ring. The substituents in the amine groups may be the same or different. One—but no more than one—of the substituents may be phenyl, tolyl or xylyl; one or both may be a cycloalkyl group such as cyclohexyl, cyclopentyl, etc.; one or both may be alkyl groups of 1 to 12 carbon atoms; one may be naphthyl. Representative of these more soluble p-phenylenediamines are:

N-phenyl-N'-cyclohexyl-p-phenylenediamine
N-phenyl-N'-cyclohexyl-p-tolylenediamine
N-phenyl-N'-cyclohexyl-p-ethylphenylenediamine
N-tolyl-N'-cyclohexyl-p-phenylenediamine
N-tolyl-N'-isopropyl-p-phenylenediamine
N-phenyl-N'-ethyl-p-phenylenediamine
N-xylyl-N'-isopropyl-p-phenylenediamine
N-phenyl-N'-amyl-p-tolylenediamine
N,N'-dimethyl-p-phenylenediamine
N,N'-dioctyl-p-phenylenediamine
N,N'-didodecyl-p-tolylenediamine
N-ethyl-N'-decyl-p-phenylenediamine
N-phenyl-N-isopropyl-p-durenediamine
N-cyclohexyl-N'-nonyl-p-phenylenediamine
N,N'-di-sec-butyl-durenediamine
N-cyclopentyl-N'-octyl-p-tolylenediamine
N,N'-di-sec-butyl-p-phenylenediamine
N,N'-di-(1-methylheptyl)-p-phenylenediamine
N,N'-di-(1-ethyl-3-methylpentyl)-p-phenylenediamine
N-isopropyl-N'-phenyl-p-phenylenediamine
N,N'-dicyclohexyl-p-phenylenediamine All position isomers of the tolyl and xylyl derivatives are included.

In producing the reaction products, the two substituted p-phenylenediamines are reacted with sulfur dichloride. One mol of the diphenyl-p-phenylenediamine component is reacted with one to two mols of the more soluble p-phenylenediamine component, and the amount of sulfur dichloride used equals the sum of the mols of the phenylenediamine reactants or said sum minus one. Thus, the reactants may be used to produce nonpolymeric and polymeric materials, the following formulae being illustrative of mixed sulfides which are components of the reaction products. The last two formulae are representative of polymeric forms, and in these an equimolecular amount of sulfur is indicated. Here DPPD is used to represent N,N'-diphenyl-p-phenylenediamine or one of its alkyl derivatives, and SPPD is used to represent the more soluble disubstituted -p-phenylenediamine.

DPPD—S—SPPD
SPPD—S—DPPD—S—SPPD
(DPPD—S—SPPD—S—)$_x$
(SPPD—S—DPPD—S—SPPD—S—)$_x$

The reaction products include components of higher and lower molecular weight, and depending upon the amount of combined sulfur used in the reaction may include polymeric materials of higher and lower molecular weight. The foregoing formulae are illustrative and the applicant does not desire to be bound thereby or by any theory relative thereto.

The reaction is preferably carried out in the presence of any suitable material which neutralizes hydrogen chloride formed during the reaction. An alkaline base material such as sodium hydroxide, potassium carbonate, etc. is preferred. Ammonia and amines such as aniline, etc. may be used. The neutralizing agent is preferably selected with a view to the ease with which the resulting salt can be separated from the mixed sulfide. The reaction can be carried out at room temperature, but is preferably carried out at 70–80° C. It may be carried out at higher temperatures where practical.

The mixed sulfide reaction products used in relatively small amounts in the order of, for example, 0.1 to 10 parts per 100 parts of rubber, are good flex-cracking inhibitors. They may be used with both synthetic and natural rubbery polymers of diolefin hydrocarbons, including the homopolymers and mixed polymers of conjugated hydrocarbon dienes having the formula

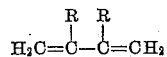

where R is hydrogen or a relatively small alkyl group (particularly butadiene and isoprene), for example, NR, IR, polybutadiene, butadiene-isoprene copolymers, etc., and copolymers of these conjugated dienes with ethylenically unsaturated monomers such as styrene, methyl-substituted styrene and other substituted styrenes, acrylonitrile, alkyl acrylates (such as methyl acrylate, alkylmethacrylates such as methylmethacrylate, etc.), methacrylonitrile, vinyl pyridines, vinylidene cyanide, etc., for example, SBR, NBR, etc.

The following examples are illustrative of the mixed sulfides and their preparation:

EXAMPLE I

N-isopropyl-N'-phenyl-p-phenylenediamine (45.2 g.) (0.2 mol) was dissolved in 600 ml. benzene and the solution heated to 70° C. N,N'-diphenyl-p-phenylenediamine (52 g.) (0.2 mol) was added and the resulting mixture stirred 30 minutes at 70° C. Sulfur dichloride (20.6 g.) (0.2 mol) dissolved in 150 ml. benzene was then added dropwise with stirring. Simultaneously a solution of sodium hydroxide (16 g.) (0.4 mol) dissolved in 150 ml. water was added dropwise with stirring. The temperature was maintained in the range 70–75° C. as follows:

|  | Elapsed time, min. | Temperature, ° C. |
|---|---|---|
| At start of additions | | 73 |
| | 15 | 68 |
| | 30 | 69 |
| At last addition | 45 | 70 |

The additions were complete in 45 minutes and the reaction mixture was stirred an additional 20 minutes at 70° C. The reaction mixture was then cooled, filtered and the aqueous layer was separated from the benzene layer. The benzene layer was washed with a solution of 35 g. of sodium chloride in 150 ml. water. The washed benzene layer was then stripped of solvent until the final stripping conditions of 130° C. and 35 mm. pressure were obtained and held for 20 minutes. The product cooled to a somewhat brittle solid; yield 100 g. (97.5%) (found 6.3% S).

EXAMPLE II

N-cyclohexyl-N'-phenyl-p-phenylenediamine (53.5 g.) (0.2 mol) was dissolved in 600 ml. benzene and the solution heated to 70° C. N,N'-diphenyl-p-phenylenediamine (26 g.) (0.1 mol) was added and the resulting mixture stirred 30 minutes at 70° C. Sulfur dichloride (20.6 g.) (0.2 mol) dissolved in 150 ml. benzene was then added dropwise with stirring. Simultaneously a solution of sodium hydroxide (16 g.) (0.4 mol) dissolved in 150 ml. water was added dropwise with stirring. The temperature was maintained in the range 70–75° C. as follows:

|  | Elapsed time, min. | Temperature, ° C. |
|---|---|---|
| At start of additions | | 70 |
| | 15 | 70 |
| | 30 | 70 |
| At last addition | 45 | 66 |

The additions were complete in 45 minutes and the reaction mixture was stirred an additional 20 minutes at 70° C. The reaction mixture was then cooled, filtered and the aqueous layer was separated from the benzene layer. The benzene layer was washed with a solution of 35 g. sodium chloride in 150 ml. water. The washed benzene layer was then stripped of solvent until the final stripping conditions of 130° C. and 35 mm. pressure were obtained and held for 20 minutes. The product solidified on cooling; yield 79 g. (92.8%) (found 7.2% sulfur).

EXAMPLE III

N-cyclohexyl-N'-phenyl-p-phenylenediamine (53.4 g.) (0.2 mol) was dissolved in 600 ml. benzene and the solution was heated to 70° C. N,N'-diphenyl-p-phenylenediamine (52 g.) (0.2 mol) was added and the resulting mixture stirred 30 minutes at 70° C. Sulfur dichloride (41.2 g.) (0.4 mol) dissolved in 150 ml. benzene was then added dropwise with stirring. Simultaneously a solution of sodium hydroxide (32 g.) (0.8 mol) in 150 ml. water was added dropwise. The temperature was maintained in the range 70–75° C. as follows:

|  | Elapsed time, min. | Temperature, ° C. |
|---|---|---|
| At start of additions | | 75 |
| | 15 | 70 |
| | 30 | 72 |
| | 45 | 72 |
| At last addition | 60 | 72 |

The additions were complete in 1 hour and the reaction mixture was stirred an additional 20 minutes at 70° C. The reaction mixture was then cooled, filtered and the aqueous layer was separated from the benzene layer. The benzene layer was washed with a solution of 35 g. sodium chloride in 150 ml. water. The washed benzene layer was then stripped of solvent until the final stripping conditions of 130° C. and 35 mm. pressure were obtained and held for 20 minutes. The product was cooled to a brittle solid; yield 105 g. (88%) (found 10.2% S).

EXAMPLE IV

N,N' - di(1-ethyl-3-methylpentyl)-p-phenylenediamine (33.2 g.) (0.1 mol) was dissolved in 300 ml. benzene. The solution was placed in a 2-liter 3-neck flask and heated to 70° C. with stirring. N,N'-diphenyl-p-phenylenediamine (13 g.) (0.05 mol) was added and the resulting mixture stirred 30 minutes at 70° C. Sulfur dichloride (10.3 g.) (0.1 mol) dissolved in 75 ml. benzene was then added dropwise with stirring. Simultaneously a solution of sodium hydroxide (8 g.) (0.2 mol) dissolved in 75 ml. water was added dropwise. The temperature was maintained in the range 70–75° C. as follows:

|  | Elapsed time, min. | Temperature, ° C. |
|---|---|---|
| At start of additions | | 70 |
| | 25 | 70 |
| | 30 | 70 |
| At last addition | 60 | 70 |

The additions were complete in 1 hour and the reaction mixture was stirred an additional 20 minutes at 70° C. The reaction mixture was then cooled, filtered and the aqueous layer was separated from the benzene layer. The benzene layer was washed with a solution of 17 g. sodium chloride in 75 ml. water. The washed benzene layer was then stripped of solvent until the final stripping conditions of 130° C. and 35 mm. pressure were obtained and held for 20 minutes. The product cooled to a viscous liquid; yield 48.8 g. (98%) (found 6.8% sulfur).

EXAMPLE V

N,N' - di(1-ethyl-3-methylpentyl)-p-phenylenediamine (66.4 g.) (0.2 mol) was dissolved in 600 ml. benzene. The solution was placed in a 2-liter 3-neck flask and heated to 70° C. with stirring. N,N'-diphenyl-p-phenylenediamine (52 g.) (0.2 mol) was added and the resulting mixture stirred 30 minutes at 70° C. Sulfur dichloride (20.6 g.) (0.2 mol) dissolved in 150 ml. benzene was then added dropwise with stirring. Simultaneously a solution of sodium hydroxide (16 g.) (0.4 mol) dissolved in 150 ml. water was added dropwise. The temperature was maintained in the range 70–75° C. as follows:

| | Elapsed time, min. | Temperature, °C. |
|---|---|---|
| At start of additions | | 70 |
| | 15 | 69 |
| | 30 | 70 |
| At last addition | 40 | 70 |

The additions were complete in 40 minutes and the reaction mixture was stirred an additional 20 minutes at 70° C. The reaction mixture was then cooled, filtered and the aqueous layer was separated from the benzene layer. The benzene layer was washed with a solution of 35 g. sodium chloride in 150 ml. water. The benzene layer was then stripped of solvent until the final stripping conditions of 130° C. and 35 mm. pressure were obtained and held for 20 minutes. The product was then poured out into a tray and solidified on cooling; yield 121.7 g. (98%) (found 5.3% sulfur).

EXAMPLE VI

N,N'-di-sec-butyl-p-phenylenediamine (54 g.) (0.25 mol) was dissolved in 600 ml. benzene. The solution was placed in a 2-liter 3-neck flask and heated to 70° C. with stirring. N,N'-diphenyl-p-phenylenediamine (65 g.) (0.25 mol) was added and the resulting mixture stirred 30 minutes at 70° C. Sulfur dichloride (25.75 g.) (0.25 mol) dissolved in 150 ml. benzene was then added dropwise with stirring. Simultaneously a solution of sodium hydroxide (20 g.) (0.5 mol) dissolved in 150 ml. water was added dropwise. The temperature was maintained in the range 70–75° C. as follows:

| | Elapsed time, min. | Temperature, °C. |
|---|---|---|
| At start of additions | | 70 |
| | 15 | 70 |
| | 25 | 68 |
| | 55 | 72 |
| At last addition | 60 | 80 |

The additions were complete in 60 minutes and the reaction mixture was stirred an additional 20 minutes at 70° C. The reaction mixture was then cooled, filtered, and the aqueous layer was separated from the benzene layer. The benzene layer was washed with a solution of 35 g. sodium chloride in 150 ml. water. The benzene layer was then stripped of solvent until the final stripping conditions of 130° C. and 35 mm. pressure were obtained and held for 20 minutes. The product was then poured out into a tray and solidified on cooling; yield 119 g. (94%) (found 6.1% sulfur).

EXAMPLE VII

N,N'-di-(1-methylheptyl)-p-phenylenediamine (66.4 g.) (0.2 mol) was dissolved in 600 ml. benzene. The solution was placed in a 2-liter 3-neck flask and heated to 70° C. with stirring. N,N'-diphenyl-p-phenylenediamine (52 g.) (0.2 mol) was added and the resulting mixture stirred 30 minutes at 70° C. Sulfur dichloride (20.6 g.) (0.2 mol) dissolved in 150 ml. benzene was then added dropwise with stirring. Simultaneously a solution of sodium hydroxide (16 g.) (0.4 mol) in 150 ml. water was added dropwise. The temperature was maintained in the range 70–75° C. as follows:

| | Elapsed time, min. | Temperature, °C. |
|---|---|---|
| At start of additions | | 70 |
| | 15 | 70 |
| | 35 | 72 |
| At last addition | 50 | 70 |

The additions were complete in 50 minutes and the reaction mixture was stirred an additional 20 minutes at 70° C. The reaction mixture was then cooled, filtered, and the aqueous layer was separated from the benzene layer. The benzene layer was washed with a solution of 35 g. sodium chloride in 150 ml. water. The benzene layer was then stripped of solvent until the final stripping conditions of 130° C. and 35 mm. pressure were obtained and held for 20 minutes. The product was then poured out into a tray and solidified on cooling; yield 124.3 g. (99.9%) (found 5.05% sulfur).

EXAMPLE VIII

N,N'-di-2-octyl-p-phenylenediamine (66.4 g.) (0.2 mol) was dissolved in 600 ml. benzene. The solution was placed in a 2-liter 3-neck flask and heated to 70° C. with stirring. N,N'-diphenyl-p-phenylenediamine (26 g.) (0.1 mol) was added and the resulting mixtures stirred 30 minutes at 70° C. Sulfur dichloride (20.6 g.) (0.2 mol) dissolved in 150 ml. benzene was then added dropwise with stirring. Simultaneously a solution of NaOH (16 g.) (0.4 mol) in 150 ml. water was added dropwise. The temperature was maintained in the range 70–75° C. as follows:

| | Elapsed time, min. | Temperature, °C. |
|---|---|---|
| At start of additions | | 73 |
| | 15 | 71 |
| | 30 | 72 |
| | 50 | 72 |
| At last addition | 55 | 72 |

The additions were complete in 55 minutes and the reaction mixture was stirred an additional 30 minutes at 70° C. The reaction mixture was then cooled, filtered, and the aqueous layer was separated from the benzene layer. The benzene layer was washed with a solution of 35 g. sodium chloride in 150 ml. water. The benzene layer was then stripped of solvent until the final stripping conditions of 135° C. and 35 mm. pressure were obtained and held for 20 minutes. The product was then poured out into a tray and solidified on cooling; yield 97.8 g. (99.5%) (found 7.18% sulfur).

EXAMPLE IX

N-isopropyl-N'-phenyl-p-phenylenediamine (45.2 g.) (0.2 mol) was dissolved in 600 ml. benzene and the solution heated to 70° C. N,N'-diphenyl-p-phenylenediamine (26 g.) (0.1 mol) was added and the resulting mixture stirred 30 minutes at 70° C. Sulfur dichloride (20.6 g.) (0.2 mol) dissolved in 150 ml. benzene was then added dropwise with stirring. Simultaneously a solution of sodium hydroxide (16 g.) (0.4 mol) dissolved in 150 ml. water was added dropwise with stirring. The temperature was maintained in the range 70–75° C. as follows:

| | Elapsed time, min. | Temperature, °C. |
|---|---|---|
| At start of addition | | 70 |
| | 15 | 68 |
| | 30 | 69 |
| | 45 | 68 |
| At last addition | 55 | 70 |

The additions were complete in 55 minutes and the reaction mixture was stirred an additional 20 minutes at 70° C. The reaction mixture was then cooled, filtered and the aqueous layer was separated from the benzene layer. The benzene layer was washed with a solution of 35 g.

sodium chloride in 159 ml. water. The washed benzene layer was then stripped of solvent until the final stripping conditions of 130° C. and 35 mm. pressure were obtained and held for 20 minutes. The product cooled to a viscous liquid; yield 72.4 g. (94%) (found 7.9% sulfur).

The various mixed sulfides were compounded with the following masterbatch:

|  | Parts by Weight |
|---|---|
| Natural rubber | 100.0 |
| HAF black | 50.0 |
| Zinc oxide | 3.0 |
| Extender | 3.0 |
| Stearic acid | 2.6 |
| Retarder | 1.0 |
| Total | 159.6 |

The resulting stocks, after adding 2.6 parts of sulfur and 0.5 part of accelerator (totaling 162.7 parts as given in the following tables) and different amounts of the various flex-cracking inhibitors (as given in the tables), were cured 40 minutes at 280° F. The products were tested for their physical properties (both before and after aging in an air oven) and for resistance to flexing in a machine such as described in Flex-Cracking Resistance by L. V. Cooper in Industrial and Engineering Chemistry, Analytical Edition, 2, 391–4 (1930). In the flex-cracking test, four cured strips of each stock were aged one day at 158° F., and then stretched 0 to 75 percent in a sidewall-flexing machine until one half of the strips were broken (or for a maximum of 15 hours). The following tables include the record of (1) the number of strips broken, (2) the average flex life which is the average number of hours the strips of a particular stock are flexed, and (3) the cracks per hour which is the total number of cracks on all of the strips of a particular stock—both broken and not broken—divided by the average flex life. The amount of inhibitor added to each sample is expressed in parts per hundred in the tables. The control against which the various samples were tested contained a commercially satisfactory flex-cracking inhibitor. Each 100 parts of rubber polymer contained 2.2 parts of 6-dodecyl-2,2,4-trimethyl-1,2-dihydroquinoline and 0.4 part of a fused mixture of 75 percent of N,N'-diphenyl-p-phenylenediamine and 25 percent of 6-dodecyl-2,2,4-trimethyl-1,2-dihydroquinoline. This control mixture includes 0.3 part of diphenyl-p-phenylenediamine which is approximately the maximum that can be used without the cured rubber blooming, plus 2.3 parts of 6-dodecyl-2,2,4-trimethyl-1,2-dihydroquinoline. The examples show the improved resistance to flex cracking obtained by use of the mixed sulfides of this invention. The tensile strength and modulus are expressed in pounds per square inch, and the elongation in percent.

Table 1

|  | Control | Stock A |
|---|---|---|
| Masterbatch: |  |  |
| Commercial | 162.7 | 162.7 |
| Example I | 1.6 | 1.5 |
| Total | 165.3 | 164.2 |
| PHYSICAL PROPERTIES |  |  |
| Normal: |  |  |
| 300% Modulus | 1,700 | 1,750 |
| Tensile strength (p.s.i.) | 3,875 | 4,000 |
| Percent elongation | 550 | 570 |
| Aged 2 days at 212° F.: |  |  |
| 300% Modulus | 1,925 | 2,200 |
| Tensile strength (p.s.i.) | 2,700 | 2,950 |
| Percent elongation | 430 | 420 |
| FLEX-CRACKING PROPERTIES |  |  |
| Strips broken | 4 | 3 |
| Avg. flex life (hrs.) | 11.7 | 12.7 |
| Cracks per hr | 15.0 | 10.2 |

Table 2

|  | Control | Stock B | Stock C | Stock D | Stock E |
|---|---|---|---|---|---|
| Masterbatch | 162.7 | 162.7 | 162.7 | 162.7 | 162.7 |
| Commercial | 2.6 |  |  |  |  |
| Example VII |  | 1.0 |  |  |  |
| Do |  |  | 2.0 |  |  |
| Example III |  |  |  | 1.0 |  |
| Do |  |  |  |  | 1.25 |
| Total | 165.3 | 163.7 | 164.7 | 163.7 | 164.7 |
| PHYSICAL PROPERTIES |  |  |  |  |  |
| Normal: |  |  |  |  |  |
| 300% modulus | 1,625 | 1,900 | 1,950 | 1,875 | 2,000 |
| Tensile strength (p.s.i.) | 3,900 | 4,150 | 4,000 | 4,000 | 4,300 |
| Percent elongation | 570 | 550 | 530 | 540 | 570 |
| Aged 2 days at 212° F.: |  |  |  |  |  |
| 300% modulus | 1,800 | 2,250 | 2,250 | 2,250 | 2,200 |
| Tensile strength (p.s.i.) | 2,675 | 2,825 | 2,825 | 2,725 | 2,800 |
| Percent elongation | 410 | 360 | 360 | 340 | 370 |
| FLEX-CRACKING PROPERTIES |  |  |  |  |  |
| Strips broken | 0 | 1 | 2 | 0 | 2 |
| Avg. flex life (hrs.) | 11.5 | 11.5 | 11.4 | 11.5 | 9.0 |
| Cracks per hr | 13.6 | 8.9 | 5.9 | 7.2 | 7.2 |

Table 3

|  | Control | Stock I | Stock J | Stock K | Stock L | Stock M |
|---|---|---|---|---|---|---|
| Masterbatch: | 162.7 | 162.7 | 162.7 | 162.7 | 162.7 | 162.7 |
| Commercial | 2.6 |  |  |  |  |  |
| Example VI |  | 1.0 |  |  |  |  |
| Do |  |  | 2.0 |  |  |  |
| Example V |  |  |  | 1.0 |  |  |
| Do |  |  |  |  | 1.5 |  |
| Do |  |  |  |  |  | 2.0 |
| Total | 165.3 | 163.7 | 164.7 | 163.7 | 164.2 | 164.7 |
| PHYSICAL PROPERTIES |  |  |  |  |  |  |
| Normal: |  |  |  |  |  |  |
| 300% modulus | 1,525 | 1,950 | 2,075 | 2,025 | 2,000 | 2,100 |
| Tensile strength (p.s.i.) | 3,850 | 4,025 | 4,075 | 4,100 | 4,250 | 4,150 |
| Percent elongation | 580 | 550 | 540 | 550 | 560 | 540 |
| Aged 2 days at 212° F.: |  |  |  |  |  |  |
| 300% modulus | 1,850 | 2,300 | 2,475 | 2,250 | 2,300 | 2,475 |
| Tensile strength (p.s.i.) | 2,625 | 2,625 | 2,925 | 2,750 | 2,850 | 2,925 |
| Percent elongation | 420 | 340 | 340 | 370 | 370 | 340 |
| FLEX-CRACKING PROPERTIES |  |  |  |  |  |  |
| Strips broken | 3 | 2 | 1 | 4 | 2 | 0 |
| Avg. flex life (hrs.) | 11.4 | 12.1 | 11.6 | 10.8 | 11.3 | 12.2 |
| Cracks per hr | 15.7 | 9.6 | 6.4 | 10.5 | 11.9 | 12.2 |

The foregoing data show that the tested compounds give cured stocks having satisfactory physical properties before and after aging. The flex-cracking data show the various test materials gave better results than the control, a commercially satisfactory stabilizer recognized as having good antioxidant and anti-flex-cracking properties.

Although each table includes data measuring the anti-flex-cracking value of the test materials in different ways, all of the reported tests show that the stocks containing the compounds of the invention had fewer cracks per hour than the respective controls.

The invention is covered in the claims which follow. What I claim is:

1. The reaction products of (1) sulfur dichloride, (2) a diaryl-arylenediamine of the class consisting of N,N'-diphenyl-p-phenylenediamine and its ring-substituted methyl and ethyl derivatives and (3) a more soluble N,N'-disubstituted arylenediamine of the class consisting of p-phenylenediamine and ring-substituted methyl and ethyl derivatives thereof in which the N,N'-substituents consist of aryl substituents of the class consisting of phenyl, tolyl, xylyl and naphthyl groups, cycloalkyl substituents of the class consisting of cyclopentyl and cyclohexyl groups, and alkyl substituents which contain 1 to 12 carbon atoms, provided, however, that the compound contain no more than one aryl substituent; the ratio of the reactants being 1 mol of said diaryl-arylenediamine to 1 to 2 mols of the more soluble arylenediamine and up to as many mols of sulfur dichloride as the sum of the mols of the other two reactants; the reaction product being substantially free of combined hydrogen chloride.

2. The reaction product of claim 1 in which the diaryl-arylenediamine is N,N'-diphenyl-p-phenylenediamine.

3. The reaction product of claim 1 in which substantially equimolar quantities of the diaryl-arylenediamine and the more soluble arylenediamine are reacted.

4. The reaction product of claim 1 in which substantially 1 mol of the diaryl-arylenediamine is reacted with 2 mols of the more soluble arylenediamine.

5. The method of curing rubber which comprises heating a rubbery polymer of a diolefin hydrocarbon with sulfur in the presence of a small amount of the reaction product of claim 1.

6. A sufur-cured rubbery polymer of a diolefin hydrocarbon which contains a small amount of the reaction product of claim 1.

References Cited in the file of this patent
UNITED STATES PATENTS

| | | |
|---|---|---|
| 2,187,155 | Ingram | Jan. 16, 1940 |
| 2,932,644 | Lambrech et al. | Apr. 12, 1960 |

UNITED STATES PATENT OFFICE
CERTIFICATE OF CORRECTION

Patent No. 3,057,819                                October 9, 1962

Richard W. Kibler

It is hereby certified that error appears in the above numbered patent requiring correction and that the said Letters Patent should read as corrected below.

Column 7, line 1, for "159" read -- 150 --; same column 7, table 1, the upper part of said table should appear as shown below instead of as in the patent:

|  | Control | Stock A |
|---|---|---|
| Masterbatch: | 162.7 | 162.7 |
|    Commercial | 2.6 |  |
|    Example I |  | 1.5 |
| Total-------------------- | 165.3 | 164.2 |
|  |  |  |

Signed and sealed this 5th day of April 1966.

(SEAL)
Attest:

ERNEST W. SWIDER                           EDWARD J. BRENNER
Attesting Officer                             Commissioner of Patents